F. W. PARSONS.
CROSS SLIDE FOR LATHES.
APPLICATION FILED JULY 14, 1919.
1,382,380.
Patented June 21, 1921.
2 SHEETS—SHEET 2.
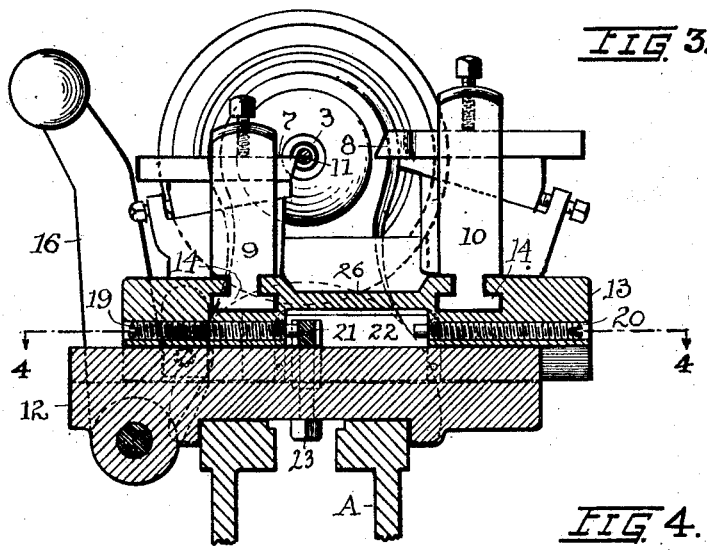
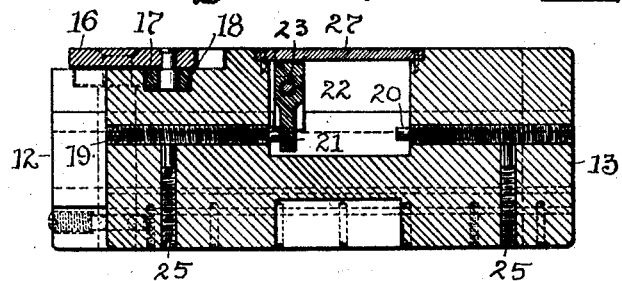
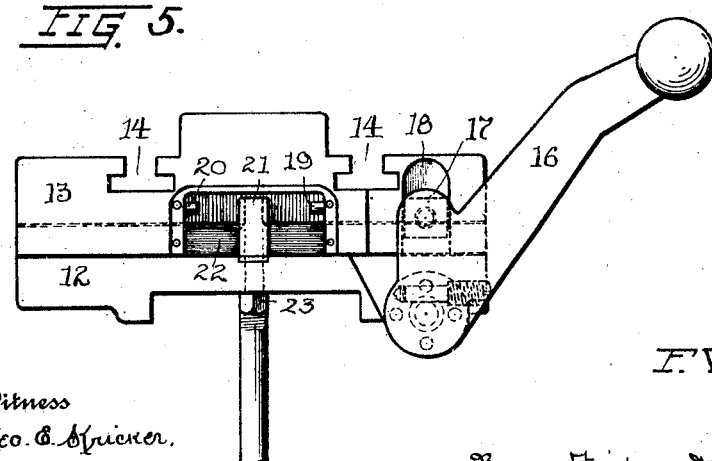
Inventor
F. W. PARSONS.
Witness
Geo. E. Stricker.
By Fisher & Moart
Attorneys

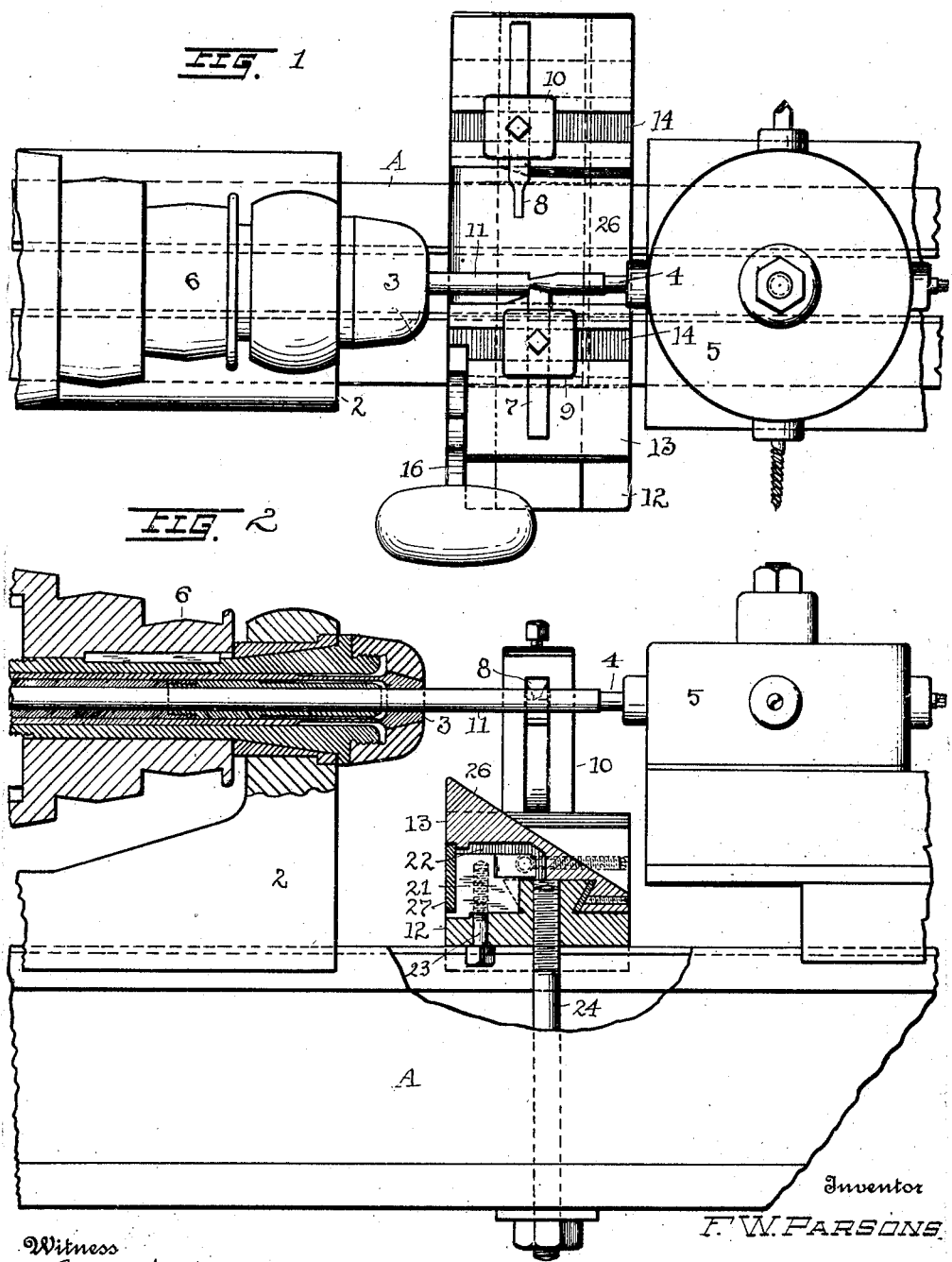

UNITED STATES PATENT OFFICE.

FREDERICK W. PARSONS, OF CLEVELAND, OHIO.

CROSS-SLIDE FOR LATHES.

1,382,380.   Specification of Letters Patent.   Patented June 21, 1921.

Application filed July 14, 1919. Serial No. 310,672.

*To all whom it may concern:*

Be it known that I, FREDERICK W. PARSONS, citizen of the United States, residing at Cleveland, in the county of Cuyahoga and State of Ohio, have invented certain new and useful Improvements in Cross-Slides for Lathes, of which the following is a specification.

This invention relates to an improvement in lathes, and the object of the invention is to provide a reciprocable cross slide for a lathe adapted to be operated by a hand lever and upon which a set of tools or tool holders are stationed for adjustment on parallel lines on opposite sides of the work and which cross slide embodies adjustable means for limiting the movement of the slide in opposite directions relatively to the work.

In the accompanying drawings, Figure 1 is a plan view of a portion of a lathe embodying my invention. Fig. 2 is a side elevation and part sectional view of the parts shown in Fig. 1. Fig. 3 is a transverse section of a lathe and the cross slide, and Fig. 4 is a horizontal section on line 4—4, Fig. 3. Fig. 5 is a side view of the cross slide with the tool holders removed and with the side cover plate removed to disclose the stops within the interior of the slide.

My invention is shown in connection with a lathe having a head stock 2 embodying a chuck 3 through which the work is fed against a stop member 4 in a turret 5. The chuck and work are rotated together by a cone pulley 6, and one or more cutting tools 7 and 8 are employed to shape the work and cut it into definite lengths. These tools are supported in suitable uprights or holders 9 and 10 located on opposite sides of the work, represented in the present instance, as a round rod 11. A ribbed base plate 12 is movably clamped upon the shears or bed A of the lathe between the head stock 2 and turret 5 and a cross slide 13 with a grooved bottom is supported upon plate 12. Parallel channels 14 in the top side of the slide permit the tool holders 9 and 10 to be shifted longitudinally in respect to rod 11 and stationed in any desired offset position relatively to each other. Thus, one tool may be used to shape the work and the other tool employed to cut it to a given length, these operations succeeding each other by reciprocating cross slide 13 so as to bring first one tool and then the other into engagement with rod 11. To attain that end I pivot a bent hand lever 16 at one corner of base plate 12 and provide this lever with a square pivot block 17 which is adapted to slide in a vertical slot 18 in one face of the cross slide 13.

The extent of movement of the cross slide in either direction is adjustably fixed by a pair of stop screws 19 and 20 which are placed on opposite sides of a stop plate 21 projecting upwardly from base plate 12 into a recess 22 within the bottom side of the cross slide. The outer ends of these stop screws have screw-driver slots exposed at the opposite ends of the cross slide and the inner ends project into recess 22 so that alternate engagement of the stop plate may occur when the cross slide is reciprocated, and the movement of the cross slide may be limited by one stop screw to the depth of cut desired by one tool and by the other stop screw to a similar depth or to the extent of severing the rod completely by the other tool. These stop screws are finely threaded to give a micrometer adjustment, and the tools are also adjustably secured within their respective holders, which holders may be constructed according to any pattern or style providing an independent setting thereof may be conveniently obtained longitudinally on the cross slide on opposite sides of the work.

A clamping bolt 24 secures base plate 12 upon the shears or bed A of the lathe, and separate set screws 25 in the cross slide are adapted to lock the stop screws 19 and 20 subsequent to any adjustment thereof. The middle portion 26 of the cross slide beneath the work and between the rabbeted channels for the tool holders is also preferably inclined or provided with a sloping surface to discharge the cuttings to one side of the cross slide. The recess 22 is located beneath this sloping surface at one side of the longitudinal center of the cross slide, and a removable face plate 27 is used to close this recess except when the stops therein are to be inspected. In effect, this recess 22 in the cross slide provides a dust proof case for the stop screws and stop, the idea being to inclose and cover the stop 21 and the inner ends of the stop screws 19 and 20, thereby protecting and guarding these parts and eliminating the possibility of any foreign matter (dirt, thick oil or chips) from getting in between the ends of the micrometer screws and the stop. If any foreign matter gets between the end of either screw and the stop, it immediately changes the diameters of the product to be turned out. Stop 21 may consist of a single screw projecting upwardly through the bottom of the slide; for example, the screw or bolt 23 which is shown as fastening the stop plate 21 in place may be placed in line with the stop screws and the plate itself omitted.

What I claim is:

1. In a lathe, a base plate, a reciprocable cross slide, having a central bottom recess closed at its sides, lever means adapted to reciprocate said cross slide, a stop member centrally of said base plate extending into said closed recess, separate adjustable stop screws within said cross slide extending into opposite ends of said closed recess on opposite sides of said stop member, a removable closure plate at one side of said recess, and separate tool holders mounted opposite each other upon said cross slide.

2. In a lathe, a base plate adapted to fit the shears or bed of a lathe, a cross slide reciprocably mounted upon said plate having parallel rabbeted channels transversely thereof and a sloping portion intermediate said channels in its top side and a recess in its bottom side beneath said sloping portion, a stop member on said plate and separate stop screws on said cross slide, and separate tool holders slidably engaged within said channels.

3. In a lathe, a cross slide having bottom recess with a removable closure plate at one side thereof, a stop screw with an operating end exposed in a retired position within the end of said slide and extending inwardly into said recess, and a stop member opposite said extremity beneath said cross slide.

4. In a lathe, a base plate having a vertical lever pivoted at one corner thereof, a cross slide upon said plate having a vertical slot in one face, a pivot member on said lever slidably seated in said slot, said slide having a recess in its bottom side and open at one side, a closure plate for the open side of said recess, a stop member projected into said recess and removable through the open side of said recess, a stop screw extending through each end of said cross slide into said recess on opposite sides of said stop member.

Signed at Cleveland, in the county of Cuyahoga, and State of Ohio, this 25th day of June, 1919.

FREDERICK W. PARSONS.